United States Patent
Pitner

[11] 3,972,574
[45] Aug. 3, 1976

[54] THRUST ROLLING BEARING HAVING CYLINDRICAL ROLLING ELEMENTS

[75] Inventor: Alfred Pitner, Paris, France
[73] Assignee: Nadella, France; a part interest
[22] Filed: Feb. 20, 1975
[21] Appl. No.: 551,276

[30] Foreign Application Priority Data
Feb. 25, 1974 France .................. 74.06309
Nov. 12, 1974 France .................. 74.37299

[52] U.S. Cl. .................. 308/235; 308/219
[51] Int. Cl.² .................. F16C 19/00
[58] Field of Search .......... 308/174, 175, 184 R, 308/184 A, 235, 236

[56] References Cited
UNITED STATES PATENTS

| 3,341,263 | 9/1967 | Pitner | 308/174 |
| 3,415,500 | 12/1968 | Pethis | 308/184 R |
| 3,632,178 | 1/1972 | Pitner | 308/174 |
| 3,900,235 | 8/1975 | Alling et al. | 308/235 |
| 3,913,994 | 10/1975 | Alling et al. | 308/235 |

FOREIGN PATENTS OR APPLICATIONS
1,295,977  5/1972  France ................ 308/174

Primary Examiner—M. H. Wood, Jr.
Assistant Examiner—Richard A. Bertsch
Attorney, Agent, or Firm—Robert E. Burns; Emmanuel J. Lobato; Bruce L. Adams

[57] ABSTRACT

The thrust rolling bearing is to be axially supported by a radial surface of a support. The retaining means of the bearing comprise a first portion for retaining the cage and a raceway plate relative to each other and a second portion which is provided with maintaining means adapted to cooperate with complementary means on the support so as to maintain the bearing assembled with the support. The first and second portions are adjacent to each other at a circumferential edge of the raceway plate.

23 Claims, 14 Drawing Figures

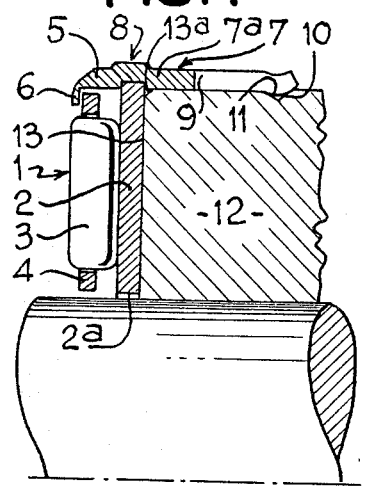
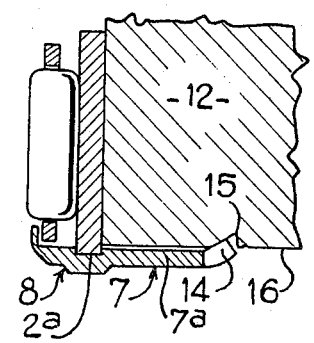
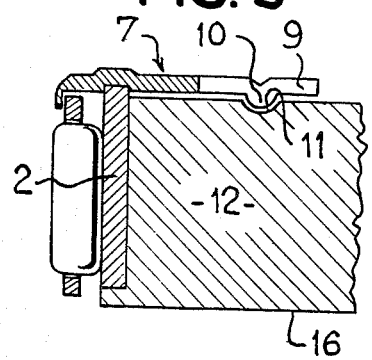
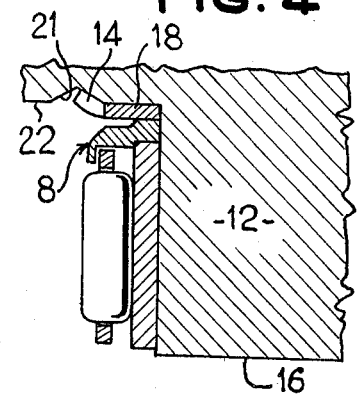
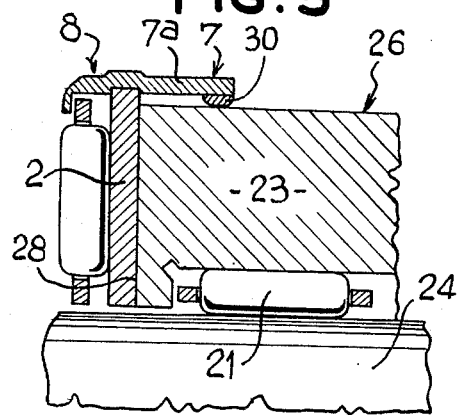
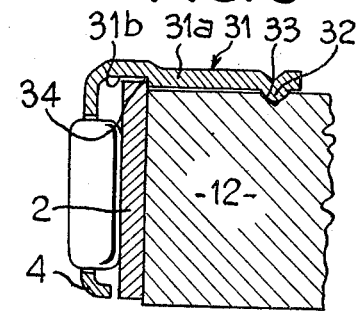

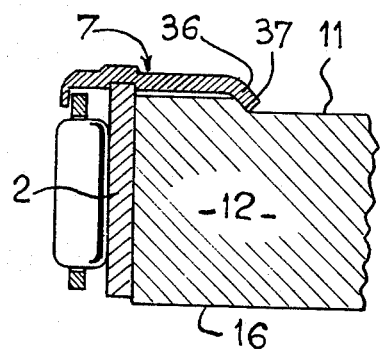
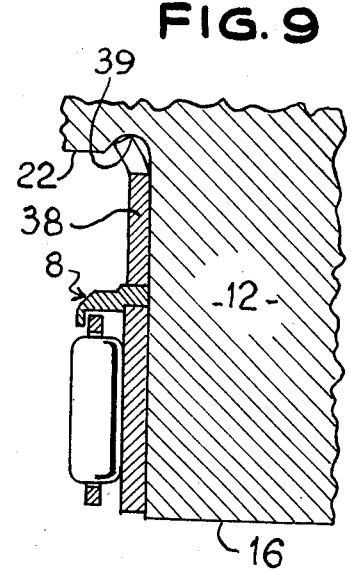
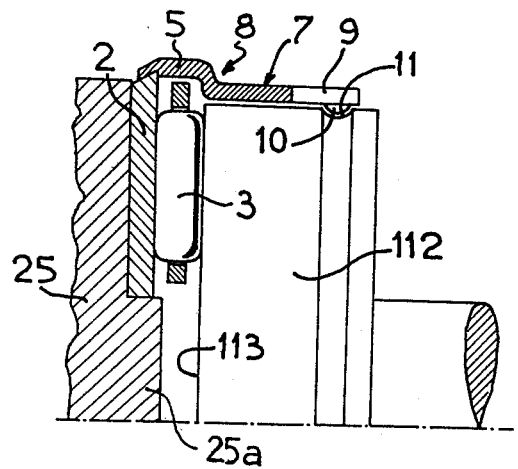

THRUST ROLLING BEARING HAVING CYLINDRICAL ROLLING ELEMENTS

The present invention relates to a thrust rolling bearing adapted to bear against a radial surface of a support and comprising retaining means including a first portion retaining, one with respect to the other, a cage in which the rolling elements are mounted and a raceway plate for the rolling elements.

According to a known arrangement, the retaining means are constituted by an annular collar fixed to the raceway plate and comprising a radial flange axially retaining the cage which latter retains the rolling elements.

Although the thrust bearing just described constitutes an assembly easy to handle, it has been necessary to provide additional means for ensuring that it is maintained on the support when it is mounted in a mechanical assembly in which it must incorporated. According to known arrangements, said additional means are constituted by the interposition of a layer of adhesive or other fastening substance between the raceway plate and the radial surface of the support or by the drive fit of the raceway plate in the support.

It is clear that the adhesion constitutes a precarious artifice whereas the drive fit results in overall deformations of the plate which cannot be considered negligible and may render it unsuitable for the rolling of the rolling elements thereon in that it is no longer planar. In the latter case, the deformed plate is liable to loose contact with the bearing surface of the support with resulting localized overloads of the plate.

Furthermore, the aforementioned assembling method, and in particular the arrangement employing a drive fit, constitutes costly solutions which are above all difficult to carry out under mass-production conditions as is the case, for example, in the automobile industry.

An object of the present invention is to overcome the aforementioned drawbacks and to provide a thrust bearing constituting an independent unit which is reliable in operation, easy to mount and provided with maintaining means to prevent any displacement of the thrust bearing with respect to said support in the axial and/or radial direction, said retaining means comprise a second portion which is provided with means co-operating with complementary means provided on the support for maintaining the thrust bearing assembled with the support, the first portion and the second portion being disposed in adjacent relation at the same circumferential edge of the raceway plate.

According to one embodiment, said second portion constitutes an extension of a collar fixed to the raceway plate and provided with a radial flange for retaining the cage, and it preferably comprises one or more bosses, or the like, adapted to engage in one or more corresponding recesses or cavities provided in the body of the support or to be elastically applied against a smooth surface of the support.

According to another embodiment, said second portion constitutes an axial extension of the cage which further comprises a shoulder for retaining the raceway plate.

According to a modification of the invention, the maintaining means are constituted by tabs which are blanked out and bent.

It is clear from the foregoing that the present invention provides a thrust bearing constituting an independent unit ready to be mounted on a support, since it comprises, on one hand, means for retaining and maintaining the cage and, on the other, maintaining means which are adapted to co-operate with the support so as to provide an assembly satisfying all the requirements concerning its mounting and subsequent correct operation.

Further features of the present invention will be more clearly apparent from the ensuing detailed description of some embodiments given merely by way of example and shown in the accompanying drawings in which:

FIG. 1 is an axial half-sectional view of an embodiment in which a retaining collar associated with the outer cylindrical surface of the plate has bosses co-operating with the support;

FIG. 2 is an axial half-sectional view of another embodiment in which the retaining collar is associated with the centre opening of the plate and has bent tabs co-operating with the support;

FIG. 3 is an axial half-sectional view of a thrust bearing similar to that shown in FIG. 1 in a working position in which centering means radially center the plate;

FIG. 4 is an axial half-sectional view of an embodiment in which an auxiliary ring carrying maintaining tabs is mounted on the cage-retaining collar;

FIG. 5 is an axial half-sectional view of a combined radial-axial rolling bearing employing the thrust bearing according to the invention;

FIG. 6 is an axial half-sectional view of an embodiment in which maintaining bosses are formed on an axial extension of the bearing cage;

FIG. 7 is an axial partial sectional view of a modification of the bosses;

FIG. 8 is a half-sectional view of an embodiment in which the maintaining means are tabs;

FIG. 9 is an axial half-sectional view of an embodiment in which the maintaining surface has a radial orientation;

FIG. 10 is an axial half-sectional view of a modification in which the rolling elements bear directly on the support which is rotatable;

Figure 11:
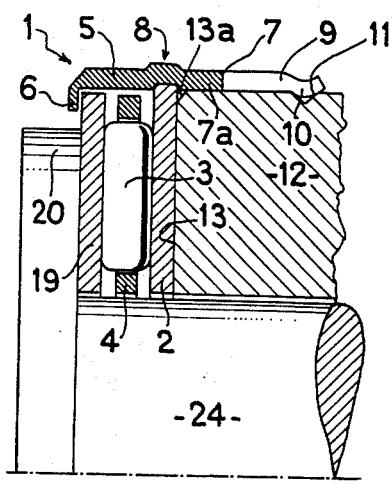
FIG. 11 is an axial half-sectional view of a needle thrust bearing comprising a retaining collar disposed on the periphery of the bearing and two thin raceway plates.

FIG. 1 shows a thrust rolling bearing 1 comprising an annular direction plate 2 for the rolling elements in the form of needles 3 which are guided by a radial cage 4 which is axially and radially retained by a cylindrical portion 5, including a radial flange 6, of a thin sheet metal collar 8 which is clipped on the peripheral cylindrical edge portion of the plate 2. The collar 8 further comprises an axial portion 7 constituting an extension extending in the direction away from the cylindrical portion 5 and including a continuous cylindrical portion 7a which terminates in tabs 9 which are spaced apart in the peripheral directin and in each one of which tabs there is formed, by deformation, a boss 10 which faces radially inwardly and is engaged, for example elastically, in a continuous groove 11 formed in the outer cylindrical surface of a fixed support 12 whose planar surface 13 acts as a radial support surface for the raceway plate 2.

To assemble with the support 12 the thrust bearing 1 constituting a unit having inseparable parts, namely the axial portion 7, the raceway plate 2, the collar 8 and the needle cage 4, it is sufficient to fit over the end portion of the support adjacent to the planar surface 13 by urging elastically outwardly the tabs 9 of the collar 8 whose rounded end portions, defined by the convex surface of the pressed-formed bosses 10, engage the outer edge (which may be if desired chamfered at 13a) of the surface 13, and urge the raceway plate 2 against this surface. The cylindrical portion 7a is then in contact with the adjacent cylindrical portion of the support 12 and the elastic engagement of the bosses 10 in the groove 11 interconnects the thrust bearing and the support.

Instead of being in one piece as shown, the retaining collar 8 may be formed by the assembly of two separate parts which are fixed to the outer edge of the plate by any suitable means.

FIG. 2 shows a modification of the embodiment shown in FIG. 1 in which the retaining collar 8 is clipped on the edge 2a of the centre opening of the annular plate 2, the axial portion 7 of the collar comprising as maintaining means tabs 14 which are blanked out and bent outwardly and engaged in a groove 15 in the bore 16 of the support 12. Moreover, the continuous cylindrical portion 7a defines a clearance with the bore 16.

This radial clearance also exists in the embodiment shown in FIG. 3 whech concerns a thrust bearing comprising means for centering the raceway plate 2. Upon mounting, the cooperation of the boss or bosses 10 ensures an essentially axial retention. In the working position for example, it is quite unnecessary that the bosses 10 bear against the groove 11.

It should be mentioned that the axial portion 9 extending beyond the boss 10 can ensure the axial centering of the thrust bearing in the course of the initial part of the mounting, whereas the elements 7 and 10 maintain the bearing in position.

In FIG. 4, the collar 8 serves exclusively to retain the needle cage 4 and there is provided as an axial maintaining portion a ring 18 which is welded to the outer cylindrical surface of the collar and extends axially in the same direction as this collar. The ring 18 is provided with blanked out and bent tabs 14 which elastically engage in a groove 21 formed in a counterbore 22 in the support 12 which has a diameter larger than that of the bore 15 and extends alongside the thrust bearing.

FIG. 5 shows at 23 a cylindrical ring of a radial needle bearing whose needles 21 are in rolling contact with a shaft 24. In this embodiment, the outer cylindrical surface 26 of the ring 23 is smooth and there is provided in the axial portion 7 of the collar 8 attached studs 30 which bear, for example elastically with a slight gripping effect, on the surface 26 with respect to which surface the cylindrical portion 7a defines a radial clearance. The raceway plate 2 is applied against the surface 28 of the ring 23.

In the embodiment shown in FIG. 6, the axial portion is constituted by an extension 31 having a generally cylindrical shape of the cage 4 containing the needles. This portion 31 terminates in an annular boss 32 which may be continuous or discontinuous and is elastically engaged in a continuous groove 33 in the support 12. To permit the rotation of the cage, a radial clearance is of course provided between the cylindrical part 31a of the anchoring portion 31 and the adjacent cylindrical surface of the support 12. This cylindrical part 31a is connected to another cylindrical part 31b which is adjacent to the active portion of the cage by a shoulder 34 whereby the raceway plate 2 is retained by the cage 4 prior to the mounting of the thrust bearing.

Whereas in FIGS. 1 and 3 it was assumed that the bosses 10 were obtained by folding, FIG. 7 shows the case where the bosses are constituted by a dimpling 36 of the metal, produced by a punch, which enters a corresponding cup-shaped cavity 37 in the support 12.

FIG. 8 shows another embodiment in which the maintaining means are constituted by tabs 36 which project toward the axis and are obtained by blanking and bending the axial portion 7 in at least one region. These tabs bear against the wall of a recess 37 formed in the support 12.

FIG. 9 shows an assembly in which the second portion 38, clipped in the collar 8, extends in a radial direction and bears at its end against a cavity 39 formed in the support 12.

In FIG. 10 the needles 3 bear directly against the radial surface 113 of the support 112 which constitutes the enlarged end portion of a rotary shaft. As in the arrangement shown in FIG. 1, studs 10 or annular beads provided on tabs 9 of the portion 7 of the collar 8 are engaged, at least in the course of mounting, in a groove 11 in the adjacent cylindrical portion of the support. The raceway plate 2 clipped on the end of the cylindrical portion 5 of the collar 8 bears against the radial surface of a frame 25 and is centered on the cylindrical surface of the projecting centre portion 25a of the frame.

FIG. 11 shows a thrust bearing 1 comprising an annular raceway plate 2 and a counter raceway plate 19 for the needles 3. The counter-plate 19 and the cage 4 are radially retained by the cylindrical portion 5 of the collar 8 and axially retained by the radial flange 6. The collar 8 is maintained on the support 12 by the axial portion 7 under the same conditions as in the embodiment shown in FIG. 1. The shaft 24, which extends through the support 12, has a shoulder 20 which bears against the counter-plate 19. The latter defines a radial clearance with the cylindrical portion 5 of the collar 8.

Figure 12:
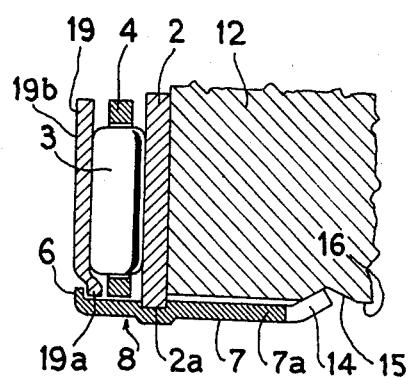
FIG. 12 is an axial half-sectional view of another embodiment having double raceway plates in which the collar is mounted on the edge of the inner opening of the thrust bearing.
Figure 13:
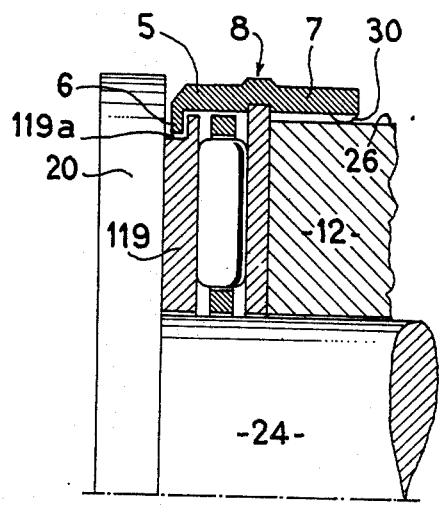
FIG. 13 is an axial half-sectional view of another embodiment having a double raceway plate and including a peripheral collar and a thick counter-plate.

FIG. 12 shows a modification of the embodiment shown in FIg. 11 in which the retaining collar 8 is clipped on the edge 2a of the centre opening of an annular raceway plate 2 and the axial portion 7 is maintained on the support as in the embodiment shown in FIG. 2. The inner edge portion 19a of the counter-plate 19 is so deformed as to be axially offset toward the cage 4 so that the radial flange 6 of the collar 8 which cooperates with the edge portion 19a is completely axially offset inwardly of the surface 19b of the counter-plate which is remote from the needles 3. FIG. 13 shows a thrust bearing assembly in which the outer cylindrical surface 26 of the support 12 is smooth and there is provided in the axial portion 7 of the collar 8 attached studs 30 which bear, for example elastically with a slight gripping action, against the surface 26. Whereas in FIGS. 11 and 12 the raceway plate 2 and the counter raceway plate 19 are thin plates, the counter-plate 119 shown in FIG. 13 is a thick plate whose periphery has a groove 119a in which there is engaged the radial flange 6 of the collar so as to permit the shoulder 20 of the shaft 24 to extend radially alongside the collar without coming in contact with the flange 6.

Figure 14:
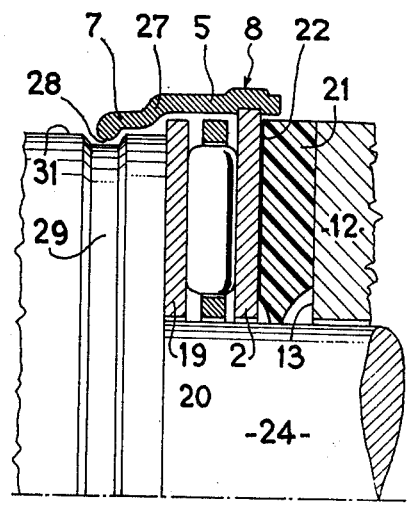
FIg. 14 is an axial half-sectional view of a thrust bearing in which there has been incorporated a washer of elastomer.

In the thrust bearing shown in FIG. 14, the cylindrical portion 5 of the collar 8 is clipped to the raceway plate 2. On the side of the latter opposed to the needles there is bonded at 22 an elastomer washer 21 which bears against the surface 13 of the support 12 in the manner described in French Pat. No. 73/10,070. Instead of being connected to the support 12, the collar 8 is connected to the cylindrical large-diameter portion 31 connected to the shoulder 20, forming a support, of the shaft 24, by, firstly, a portion 27 having a radial flange 28 formed at the end of the cylindrical axial portion 7 of the collar which is connected to the portion 5, of larger diameter, by a shoulder 27 which axially retains the counter-plate 19 and, secondly, a groove 29 formed in the cylindrical surface 31 of the shoulder, in which groove the radial flange 28 is engaged, if desired with a sliding contact owing to the rotation of the shaft 24.

The position of the elastomer washer 21 may be modified and there may be provided a second washer bonded to the counter-plate 19 in accordance with the modifications described in the aforementioned patent.

It will be clear from the foregoing that the invention provides a thrust rolling bearing which constitutes an independent unit provided with means for maintaining it on a support of a machine or incorporating it in a radial rolling bearing without risk of damage to the thrust bearing while ensuring a correct operation owing to correct positioning and centering.

Having now described my invention what I claim as new and desire to secure by Letters Patent is:

1. A thrust rolling bearing for being axially supported by a radial surface of a support and comprising rolling elements, a cage in which the rolling elements are mounted, a raceway plate for the rolling elements, the raceway plate having a circumferentially extending edge, retaining means comprising a first portion which retains the cage and raceway plate with respect to each other and a second portion having maintaining means for cooperation with complementary means provided on the support for maintaining the thrust bearing assembled with the support, the first portion and second portion being in adjacent relation at said edge of the raceway plate and extending in the same axial direction relative to the raceway plate.

2. A thrust rolling bearing for being axially supported by a radial surface of a support and comprising rolling elements, a cage in which the rolling elements are mounted, a raceway plate for the rolling elements, the raceway plate having a circumferentially extending edge portion, retaining means comprising a first portion which retains the cage and raceway plate with respect to each other and a second portion having maintaining means for cooperation with complementary means provided on the support for maintaining the thrust bearing assembled with the support, the first portion and second portion being in adjacent relation at said edge portion of the raceway plate, the first portion being fixed to said edge portion and extending in an axial direction relative to the raceway plate and the second portion being fixed to the first portion and extending in a radial direction in the same plane as the raceway plate.

3. A thrust rolling bearing for being axially supported by a radial surface of a support and comprising rolling elements, a cage in which the rolling elements are mounted, a raceway plate for the rolling elements, the raceway plate having a circumferentially extending edge portion, retaining means comprising a first portion which retains the cage and raceway plate with respect to each other and a second portion having maintaining means for cooperation with complementary means provided on the support for maintaining the thrust bearing assembled with the support, the first portion being constituted by a collar which is fixed to said edge portion and defines a radial flange for axially retaining the cage, the second portion being constituted by an axial extension of the collar.

4. A thrust rolling bearing for being axially supported by a radial surface of a support and comprising rolling elements, a cage in which the rolling elements are mounted, a raceway plate for the rolling elements, the raceway plate having a circumferentially extending edge, retaining means comprising a first portion which retains the cage and raceway plate with respect to each other and a second portion having maintaining means for cooperation with complementary means provided on the support for maintaining the thrust bearing assembled with the support, the first portion and second portion being in adjacent relation at said edge of the raceway plate and extending in different axial directions relative to the raceway plate, the first portion being constituted by a collar which is in fixed relation to the raceway plate and defines a radial flange for axially retaining the cage, the second portion being constituted by a ring in fixed relation to the collar.

5. A thrust rolling bearing as claimed in claim 4, wherein the raceway plate has an outer edge portion and the collar is fixed to the outer edge portion.

6. A thrust rolling bearing as claimed in claim 4, wherein the ring is discontinuous.

7. A thrust rolling bearing for being axially supported by a radial surface of a support and comprising rolling elements, a cage in which the rolling elements are mounted, a raceway plate for the rolling elements, the raceway plate having a
   circumferentially extending edge, retaining means comprising a first portion which retains the cage and raceway plate with respect to each other and a second portion having maintaining means for cooperation with complementary means provided on the support for maintaining the thrust bearing assembled with the support, the first portion being constituted by a collar which defines a radial flange for axially retaining the cage, the second portion being constituted by an extension of the collar, the raceway plate having an outer edge portion and the collar being fixed to the outer edge portion.

8. A thrust rolling bearing as claimed in claim 7, wherein the maintaining means of the second portion is constituted by at least one projecting portion carried by the collar extension for engaging in complementary recess means in the support.

9. A thrust rolling bearing as claimed in claim 7, wherein the maintaining means of the second portion is constituted by at least one projecting member attached to the collar extension for bearing against the support.

10. A thrust rolling bearing as claimed in claim 7, comprising an elastomer washer bonded to the raceway plate on the side of the raceway plate remote from the rolling elements.

11. A thrust rolling bearing as claimed in claim 7, wherein the maintaining means of the second portion is constituted by at least one projecting means carried by the collar extension for engaging the support.

12. A thrust rolling bearing as claimed in claim 11, wherein the projecting portion is constituted by a boss obtained by deformation of the second portion.

13. A thrust rolling bearing as claimed in claim 11, wherein there are a plurality of projecting portions constituted by studs attached to the collar extension.

14. A thrust rolling bearing for being axially supported by a radial surface of a support and comprising rolling elements, a cage in which the rolling elements are mounted, a raceway plate for the rolling elements, the raceway plate having a circumferentially extending edge, retaining means comprising a first portion which retains the cage and raceway plate with respect to each other and a second portion having maintaining means for cooperation with complementary means provided on the support for maintaining the thrust bearing assembled with the support, the first portion being constituted by a collar which defines a radial flange for axially retaining the cage, the second portion being constituted by an extension of the collar, the raceway plate having an inner edge portion and the collar being fixed to the inner edge portion.

15. A thrust rolling bearing for being axially supported by a radial surface of a support and comprising rolling elements, a cage in which the rolling elements are mounted, a raceway plate for the rolling elements, the raceway plate having a circumferentially extending edge, retaining means comprising a first portion which retains the cage and raceway plate with respect to each other and a second portion having maintaining means for cooperation with complementary means provided on the support for maintaining the thrust bearing assembled with the support, the second portion being an axial extension of the cage, the first portion being a shoulder on the cage for axially retaining the raceway plate.

16. A thrust rolling bearing for being axially supported by a radial surface of a support and comprising rolling elements, a cage in which the rolling elements are mounted, a raceway plate for the rolling elements, the raceway plate having a circumferentially extending edge, retaining means comprising a first portion which retains the cage and raceway plate with respect to each other and a second portion having maintaining means for cooperation with complementary means provided on the support for maintaining the thrust bearing assembled with the support, the first portion and second portion being in adjacent relation at said edge of the raceway plate, the maintaining means of the second portion being constituted by at least one projection which is formed on the second portion for bearing against a smooth surface of the support.

17. A thrust rolling bearing for being axially supported by a radial surface of a support and comprising rolling elements, a cage in which the rolling elements are mounted, a raceway plate for the rolling elements, the raceway plate having a circumferentially extending edge, retaining means comprising a first portion which retains the cage and raceway plate with respect to each other and a second portion having maintaining means for cooperation with complementary means provided on the support for maintaining the thrust bearing assembled with the support, the first portion and second portion being in adjacent relation at said edge of the raceway plate, the maintaining means of the second portion comprising a plurality of projecting portions constituted by blanked and bent tabs provided at an end of the second portion remote from the raceway plate.

18. A thrust rolling bearing for being axially supported by a radial surface of a support and comprising rolling elements, a cage in which the rolling elements are mounted, a raceway plate for the rolling elements, a counter-plate constituting a second raceway plate for the rolling elements, the first-mentioned raceway plate having a circumferentially extending edge, retaining means comprising a first portion which retains the cage and the first-mentioned raceway plate with respect to each other and a second portion having maintaining means for cooperation with complementary means provided on the support for maintaining the thrust bearing assembled with the support, the first portion and second portion being in adjacent relation at said edge of the first-mentioned raceway plate, the counter-plate being retained by the first portion of the retaining means.

19. A thrust rolling bearing as claimed in claim 18, wherein a shoulder formed in the collar and constituting a connection between the two portions of the retaining means retains the counter-plate.

20. A thrust rolling bearing for being axially supported by a radial surface of a support and comprising rolling elements, a cage in which the rolling elements are mounted, a raceway plate for the rolling elements, the raceway plate having a circumferentially extending edge, retaining means comprising a first portion which retains the cage and raceway plate with respect to each other and a second portion having maintaining means for cooperation with complementary means provided on the support for maintaining the thrust bearing assembled with the support, the first portion and second portion being in adjacent relation at said edge of the raceway plate and extending in different axial directions relative to the raceway plate, the first portion being constituted by a collar which is in fixed relation to the raceway plate and defines a radial flange for axially retaining the cage, the second portion being constituted by an extension of the collar, a thin counter-plate constituting a second raceway plate for the rolling elements, the counter-plate having an edge portion cooperating with the radial flange of the collar and deformed to be axially offset towards the rolling elements.

21. A thrust rolling bearing for being axially supported by a radial surface of a support and comprising rolling elements, a cage in which the rolling elements ae mounted, a raceway plate for the rolling elements, the raceway plate having a circumferentially extending edge, retaining means comprising a first portion which retains the cage and raceway plate with respect to each other and a second portion having maintaining means for cooperation with complementary means provided on the support for maintaining the thrust bearing assembled with the support, the first portion and second portion being in adjacent relation at said edge of the raceway plate and extending in different axial directions relative to the raceway plate, the first portion being constituted by a collar which is in fixed relation to the raceway plate and defines a radial flange for axially retaining the cage, the second portion being constituted by a ring in fixed relation to the collar, a thin counter-plate constituting a second raceway plate for the rolling elements, the counter-plate having an edge portion cooperating with the radial flange of the collar and deformed to be axially offset towards the rolling elements.

22. A thrust rolling bearing for being axially supported by a radial surface of a support and comprising rolling elements, a cage in which the rolling elements are mounted, a raceway plate for the rolling elements, the raceway plate having a circumferentially extending edge, retaining means comprising a first portion which retains the cage and raceway plate with respect to each other and a second portion having maintaining means for cooperation with complementary means provided on the support for maintaining the thrust bearing assembled with the support, the first portion and second portion being in adjacent relation at said edge of the raceway plate and extending in different axial directions relative to the raceway plate, the first portion being constituted by a collar which is in fixed relation to the raceway plate and defines a radial flange for axially retaining the cage, the second portion being constituted by an extension of the collar, a thick counter-plate constituting a second raceway plate for the rolling elements, the counter-plate having an edge portion which is cooperative with the radial flange of the collar and has a groove in which the flange is engaged.

23. A thrust rolling bearing for being axially supported by a radial surface of a support and comprising rolling elements, a cage in which the rolling elements are mounted, a raceway plate for the rolling elements, the raceway plate having a circumferentially extending edge, retaining means comprising a first portion which retains the cage and raceway plate with respect to each other and a second portion having maintaining means for cooperation with complementary means provided on the support for maintaining the thrust bearing assembled with the support, the first portion and second portion being in adjacent relation at said edge of the raceway plate and extending in different axial directions relative to the raceway plate, the first portion being constituted by a collar which is in fixed relation to the raceway plate and defines a radial flange for axially retaining the cage, the second portion being constituted by a ring in fixed relation to the collar, a thick counter-plate constituting a second raceway plate for the rolling elements, the counter-plate having an edge portion which is cooperative with the radial flange of the collar and has a groove in which the flange is engaged.

* * * * *